United States Patent [19]
Shaltis et al.

[11] 3,822,787
[45] July 9, 1974

[54] FLUID FILTER DEVICE

[75] Inventors: Robert J. Shaltis; David Woltjer, both of Hastings, Mich.

[73] Assignee: Hastings Manufacturing Company, Hastings, Mich.

[22] Filed: May 8, 1972

[21] Appl. No.: 250,925

Related U.S. Application Data

[63] Continuation-in-part of Ser. No. 206,713, Dec. 10, 1971, Pat. No. 3,722,683.

[52] U.S. Cl................. 210/132, 210/440, 210/443
[51] Int. Cl....................... B01d 35/14, B01d 27/10
[58] Field of Search ........... 210/130, 131, 132, 440, 210/443

[56] References Cited
UNITED STATES PATENTS

| | | | |
|---|---|---|---|
| 3,193,101 | 7/1965 | Humbert, Jr. | 210/130 |
| 3,224,591 | 12/1965 | Sawyer | 210/443 X |
| 3,268,077 | 8/1966 | Ball | 210/132 X |
| 3,467,256 | 9/1969 | Humbert, Jr. et al. | 210/132 |
| 3,608,724 | 9/1971 | Baldwin | 210/130 |

Primary Examiner—Frank A. Spear, Jr.

[57] ABSTRACT

A housing has a closed end and a closure plate at its other end, the plate being provided with a fluid inlet and a fluid outlet. A filter cartridge is positioned in the housing against a support on the closure plate, the cartridge including a central tubular discharge member which communicates with the fluid outlet. A leaf spring adapter is interposed between the other end of the cartridge and the closed end of the housing to bias the cartridge against the support on the plate. The adapter has a central opening which is normally covered by a spring-pressed valve element, but the valve element is deflectable from the adapter to uncover the opening by excessive fluid pressure differential between the outside of the cartridge and the inside of the discharge member. In some embodiments the valve element is imperforate and normally closes the opening in the adapter, becoming open when flow through the cartridge is blocked. In another embodiment the valve element has an opening in register with that in the adapter and the opening in the valve element is covered by a screen which constitutes a secondary filtering medium additional to the primary filtering medium afforded by the cartridge. In that embodiment the valve element becomes open when the screen is blocked, as it does in still other embodiments where the valve element may be the screen itself.

24 Claims, 12 Drawing Figures

3,822,787

3,822,787

FLUID FILTER DEVICE

RELATED APPLICATIONS

This application is a continuation-in-part of copending application Ser. No. 206,713, filed Dec. 10, 1971, now U.S. Pat. No. 3,722,683, dated Mar. 27, 1973 which in turn relates to modifications and improvements in the disclosures of copending application Ser. No. 113,283, filed Feb. 8, now U.S. Pat. No. 3,726,403, dated Apr. 10, 1973 1971 by one of the joint applicants in the present application, application Ser. No. 113,283 being a continuation-in-part of an earlier application Ser. No. 36,971, filed May 13, 1970 now abandoned.

This invention relates to new and useful improvements in fluid filter devices, and in particular the invention concerns itself with so-called spin-on type of filters used in the lubricating systems of internal combustion engines or the like.

A filter of this general type has a housing containing a filter cartridge, the housing including a closure plate at one end thereof which is provided with an oil inlet and an oil outlet. The oil flows into the housing to the outside of the cartridge, then inwardly through the filter material of the cartridge and into a central tubular discharge member of the cartridge, from where it leaves through the oil outlet in the closure plate. Usually, a spring is interposed between the cartridge and the other, closed end of the housing to bias the cartridge into engagement with the closure plate, or a gasket or some other support means provided on the closure plate.

It is customary in the art to provide some type of a pressure relief valve or a by-pass valve so that oil may flow from the outside of the cartridge directly into the discharge member when flow through the filter material of the cartridge is impeded or blocked. It is also known, as in the two aforementioned applications Ser. No. 36,971 and 113,283 to provide a dual flow arrangement with a primary fluid flow through the cartridge and a secondary fluid flow through a screen at a metered rate, so as to accommodate full flow requirements of a particular lubricating system. The aforementioned applications also provide for a by-pass for the secondary filter screen under excessive fluid pressure, as when flow through the screen becomes impeded or blocked.

The present invention has as its principal object to provide an improved fluid filter device in which a leaf spring type of an adapter is provided at the closed end of the housing to bias the cartridge toward the closure plate at the other end, in place of a helical compression spring which is commonly used for that purpose.

In conjunction with the leaf spring adapter, another object of the invention is to provide a spring-pressed valve element which cooperates with an opening at the center of the adapter for by-passing fluid into the tubular discharge member of the cartridge when flow through the filter material of the cartridge is blocked.

In modified embodiments, another object of the invention is to utilize a filter screen as the valve element in a dual flow arrangement of the filter, the screen being spring-pressed and also functioning as a by-pass valve when flow through the screen is blocked.

With the foregoing more important objects and features in view and such other objects and features which may become apparent as this specification proceeds, the invention will be understood from the following description taken in conjunction with the accompanying drawings, wherein like characters of reference designate like parts, and wherein.

Figure 1:
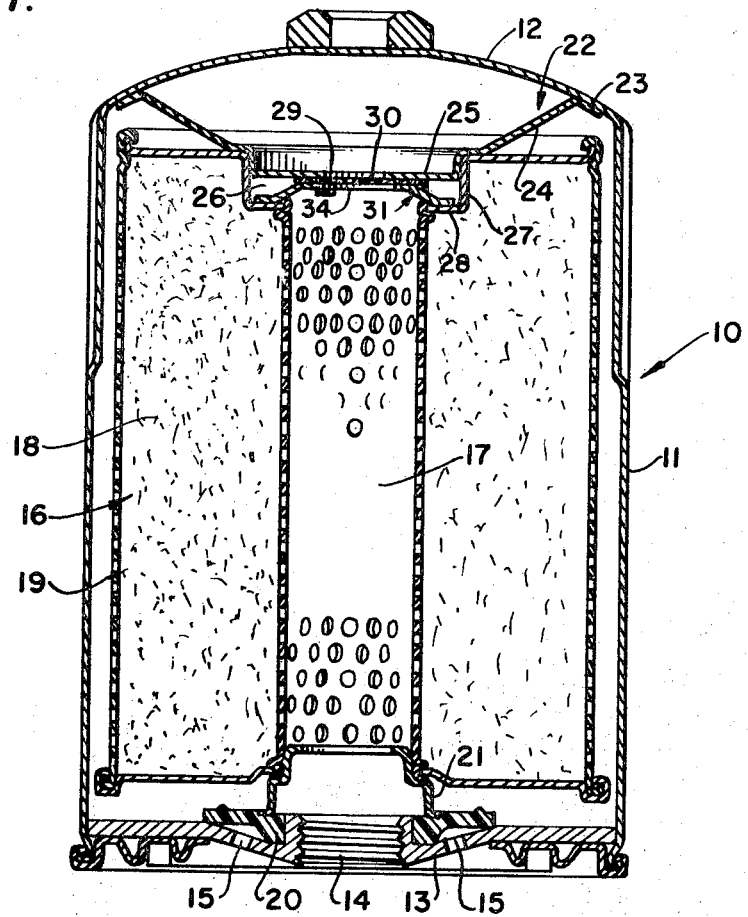
FIG. 1 is a vertical sectional view of a fluid filter device embodying the invention.

Referring now to the accompanying drawings in detail, the fluid filter device of the invention shown in FIG. 1 is designated by the general reference numeral 10 and is in the form of a spin-on type oil filter used in lubricating systems of internal combustion engines, or the like.

The filter 10 includes a housing 11 with a closed end 12 and an open end which is closed by a closure plate 13 in the conventional manner, the closure plate having a central fluid outlet 14 and a plurality of fluid inlets 15 arranged in circular formation around the outlet. The outlet is internally screw-threaded for mounting the entire filter on the engine block. A filter cartridge 16 is positioned in the housing 11 and includes a central tubular discharge member 17 surrounded by filtering material 18, the outer wall 19 of the cartridge and the central member 17 being perforate so that oil entering the housing through the inlets 15 may flow to the outside of the cartridge and then inwardly through the filter material 18 into the central discharge member 17 in the conventional manner. The lower end of the cartridge 16 is seated on a suitable support which in the illustrated instance is represented by a gasket 20 of rubber, or the like. The gasket surrounds the oil outlet 14 and the engagement of the lower end portion 21 of the cartridge with the gasket isolates the outlet 14 from the inlets 15 so that oil in the central member 17 of the cartridge flows out through the outlet 14. In the illustrated instance the gasket 20 also serves as a valve which closes the inlets 15 and prevents drain-back therethrough when the engine is not in operation. It is to be understood that the structure thus far described is conventional and is mentioned here merely as a background of the invention, a description of which now follows.

In accordance with the invention, the cartridge 16 is biased into a sealing engagement with the gasket 20 by a one piece leaf spring adapter 22 which is interposed between the upper end of the cartridge and the closed end 12 of the housing 11. As shown in the plan view of FIG. 3, the leaf spring adapter 22 is substantially rectangular and has arcuate end portions 23 which seat against the inside of the closed end 12 of the housing. Intermediate portions 24 of the adapter slant downwardly and inwardly toward a depressed or well-shaped center portion 25 and the latter is tightly fitted into an annular recess 26 provided in the upper end portion of the cartridge 16, concentrically with the central discharge member 17, as will be apparent from FIG. 1. The recess 26 has a circumferential wall 27 and an annular shoulder 28, the center portion 25 of the adapter being telescoped in the wall 27. The axial depth of the recess 26 is greater than that of the depressed center portion 25 of the adapter, so that the center portion 25 is spaced upwardly from the shoulder 28, as will be understood from FIGS. 1 and 2.

Figure 2:
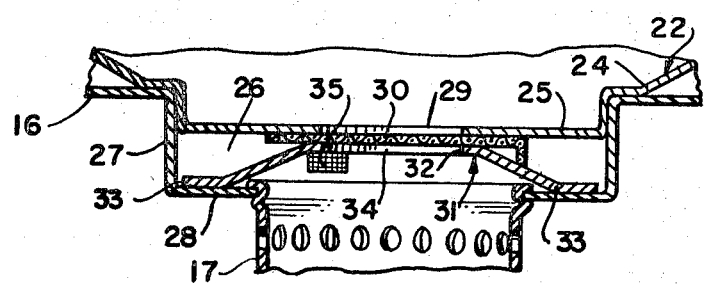
FIG. 2 is an enlarged, fragmentary sectional view of the upper end portion of the cartridge, also showing the adapter, valve element and screen.
Figure 3:
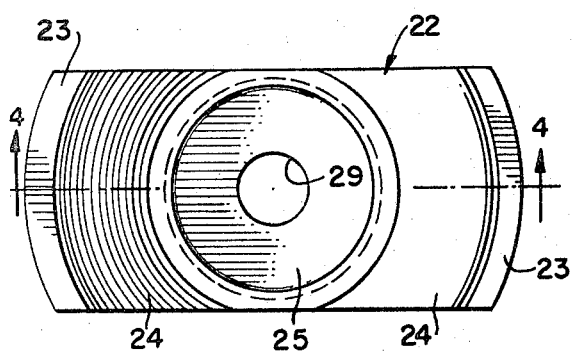
FIG. 3 is a plan view of the adapter per se.
Figure 4:
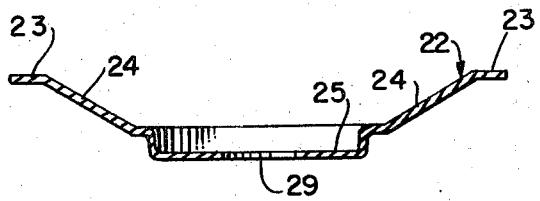
FIG. 4 is a sectional view taken substantially in the plane of the line 4—4 in FIG. 3.

The center portion 25 of the adapter 22 is provided with a central opening 29 which communicates with the interior of the discharge member 17 of the cartridge 16. The filter shown in FIGS. 1 and 2 is a dual flow filter of the type disclosed in the aforementioned applications Ser. No. 36,971 and No. 113,283. In this type of filter a primary fluid flow is provided through the filter material 18 of the cartridge 16, and a secondary fluid flow is provided through a screen directly into the tubular discharge member 17 through a metering orifice. The screen is a coarser filtering medium than the filter material of the cartridge and is provided to accomodate the quantity of oil pumped through the lubricating system which is in excess of the amount of oil capable of being handled by the finer filtering material of the cartridge.

Figure 5:
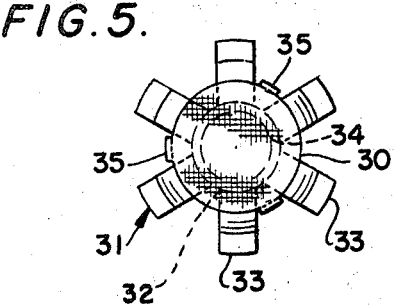
FIG. 5 is a plan view of the valve element and screen thereon.

In a dual flow filter of this type, the secondary oil flow is through the opening 29 of the adapter 22 into the discharge member 17 of the cartridge, the opening 29 being of such size as to serve as a metering orifice for the secondary flow. The filter screen 30, substantially circular in shape as shown in FIG. 5, is supported below the center portion 25 of the adapter by a leaf spring type valve element 31 which is disposed in the recess 26 and seated on the annular shoulder 28. The valve element 31 as shown in FIG. 5 has a circular center portion 32 integral with a plurality of resiliently flexible legs 33 which radiate from the center portion and seat on the shoulder 28, as will be apparent from FIG. 2. The center portion 32 is formed with an opening 34 of the same size as the opening 29 in the adapter 22. The screen 30 is positioned on top of the center portion 32 of the valve element 31 and the periphery of the screen is provided integrally with a set of downturned tabs 35 which are received in spaces between the legs 33 of the valve element, thus retaining the screen in concentric position on the valve element. The resiliency of the valve element 31 normally biases the screen 30 against the underside of the center portion 25 of the adapter 22.

In operation, primary oil flow is through the filter material 18 of the cartridge 16 into the discharge member 17. Secondary oil flow is through the metering opening 29 in the adapter 22, through the screen 30, and through the opening 34 in the valve element 31 into the discharge member 17. If either or both the primary oil flow and the secondary oil flow should become impeded or blocked, the fluid pressure at the outside of the cartridge 16 will rise abnormally above that inside the discharge member 17 and the excessive pressure differential will cause the screen 30 and the center portion 32 of the valve element 31 to be deflected downwardly or away from the underside of the center portion 25 of the adapter 22. Thus the oil will by-pass the screen 30 and will flow directly into the discharge member 17.

Figure 6:
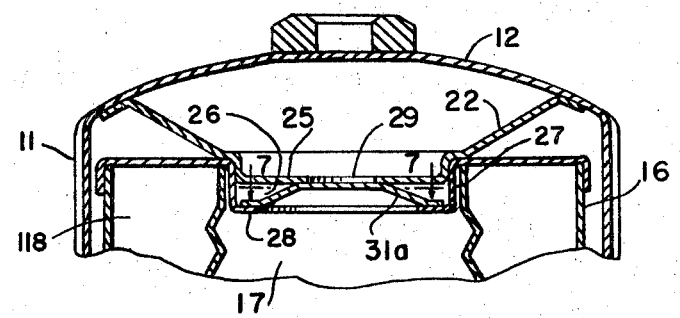
FIG. 6 is a fragmentary vertical sectional view showing a modified embodiment of the invention.
Figure 7:
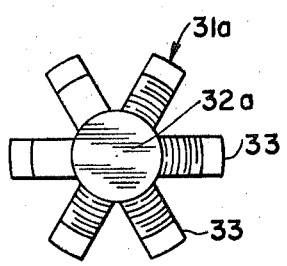
FIG. 7 is a plan view of the valve element, taken substantially in the plane of the line 7—7 in FIG. 6.
Figure 8:
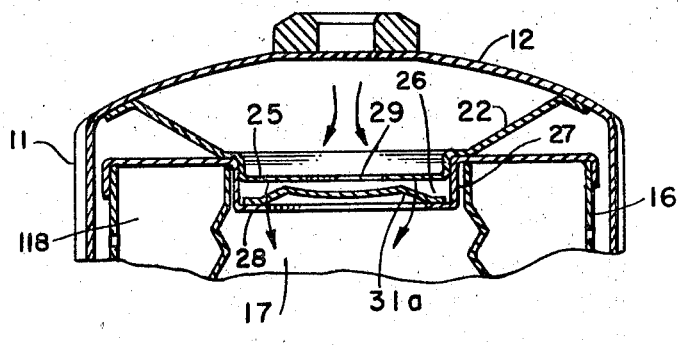
FIG. 8 is a view similar to FIG. 6 but with the valve element in the open position.

FIG. 6–8 illustrate a modified embodiment of the invention in a single flow type filter which does not have a secondary flow through a screen such as the screen 30 in the embodiment of FIGS. 1–5. The structure in FIGS. 6–8 is similar to that already described, except that the screen 30 is omitted and the center portion 32a of the valve element 31a is not provided with the opening 34, and a corrugated paper cartridge 118 is substituted for the depth cartridge 18 shown in the earlier embodiments.

The resilient valve element 31a is biased so that its center portion 32a normally closes the opening 29 in the adapter 22, as long as there is satisfactory flow through the filter material of the cartridge 16. However, if that flow is impeded or blocked, the excessive pressure differential causes the center portion 32a of the valve element to be deflected downwardly from the center portion 25 of the adapter 22 as shown in FIG.. 8, permitting oil to flow directly into the discharge member 17 of the cartridge in by-pass of the cartridge filtering material. The closed position of the valve element 31a is illustrated in FIG. 6.

Figure 9:
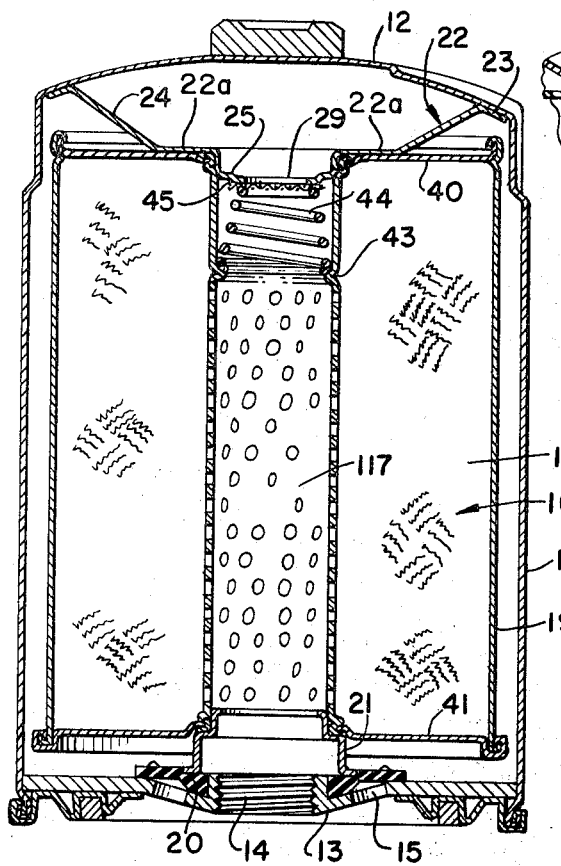
FIG. 9 is a vertical sectional view showing another modified embodiment of the fluid filter device.
Figure 10:
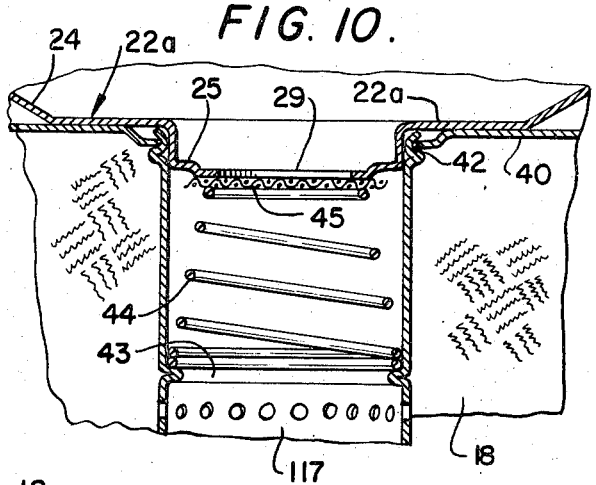
FIG. 10 is an enlarged, fragmentary sectional view of the upper end portion of the device shown in FIG. 9.

FIGS. 9 and 10 illustrate another modified embodiment of the valve arrangement in a filter of the type shown in FIG. 1, and since the filter structure is the same, corresponding reference numerals are used in FIG. 9 and 10. However, in this instance the central tubular discharge member 117 is co-extensive with the length of the cartridge 16, extending between the end caps 40 and 41 of the cartridge and being secured to end caps as at 42 (see FIG. 10).

The leaf spring adapter 22 includes a wide flat portion 22a which engages the flat end cap 40 and the center portion 25 of the adapter is tightly fitted into the adjacent end portion of the tubular member 117, the portion 25 being provided with the opening 29 which communicates with the interior of the discharge member 117, as will be apparent. An inwardly projecting annular shoulder 43 is formed integrally intermediate the ends of the tubular member 117, adjacent the end cap 40 for seating a helical compression spring 44. The annular shoulder 43 is a flattened annular bead formed by inwardly beading the tubular member 117 and then flattening the bead out so that the surface of bead on which the coil spring 44 rests lies in a plane which is substantially perpendicular to the longitudinal axis of the tubular member 117. The spring bears against a valve element 45 and urges it against the center portion 25 of the adapter 22 so that the valve element normally covers the opening 29. If the filter is a dual flow filter with a primary flow through the filtering medium 18, the valve element comprises a screen disc and the secondary flow takes place through it, directly into the discharge member 117. The opening 29 is of such size as to serve as a metering orifice for the secondary flow. The screen 45 is a coarser filtering medium than the filter medium 18 of the cartridge, and the secondary flow through the screen is provided to accomodate the quantity of oil pumped through the lubricating system in excess of the amount of oil capable of being handled by the finer material of the filtering medium 18 in the primary flow.

If either or both the primary flow through the filter medium 18 and the secondary flow through the screen 45 should become blocked or impeded, the fluid pressure at the outside of the cartridge 16 will rise abnormally above that inside the discharge member 117 and the excessive pressure differential will cause the screen 45 to be deflected away from the center portion 25 of the adapter 22, against the action of the spring 44. The opening 29 will thus be uncovered and the oil will flow through the opening directly into the discharge member 117.

Of course, if the filter should be a single flow type, with flow normally through the filter medium 18 of the cartridge, the valve element 45 may be a solid, imperforate disc which normally closes the opening 29 and blocks oil flow therethrough. However, if flow through the filter medium 18 is blocked or impeded, the abnormally high fluid pressure at the outside of the cartridge will deflect the valve element from the adapter portion 25 to uncover the opening 29 and by-pass the flow directly into the discharge member 117.

Figure 11:
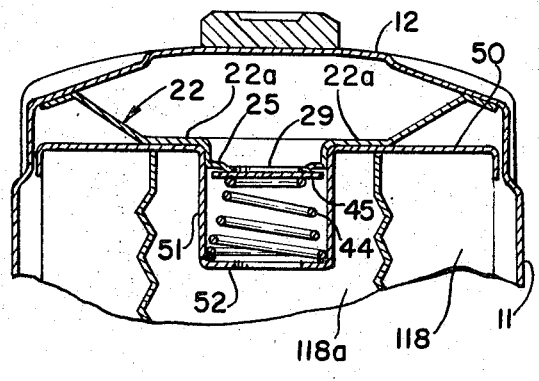
FIG. 11 is a fragmentary sectional view of another modified embodiment.

FIG. 11 shows another modified embodiment which is somewhat similar to that in FIGS. 6–8 insofar that it utilizes a corrugated paper cartridge 118 with a single fluid flow therethrough. The cartridge is provided with an end cap 50 which is engaged by the leaf spring adapter 22. The end cap 50 is annular and is formed integrally at the center thereof with an inwardly projecting circumferential wall 51 which terminates at its inner end in an inturned annular shoulder 52.

The annular wall 51 is disposed concentrically within the central discharge passage 118a of the cartridge 118, and the central portion 25 of the adapter 22 is fitted tightly into the annular wall 51 at the end cap 50. The wall 51 contains a helical compression spring 44 which is seated on the shoulder 52 and urges a valve element 45 against the adapter portion 25 so as to cover the opening 29.

In the instance of a single flow filter with a paper cartridge such as the cartridge 118, the valve element 45 comprises a solid, imperforate disc which normally closes the opening 29 and becomes unseated against the action of the spring 44 in the event of abnormal pressure, to facilitate oil by-pass directly into the discharge passage 118a. However, in a dual flow arrangement, the valve element 45 may be a screen, facilitating secondary flow therethrough.

Figure 12:
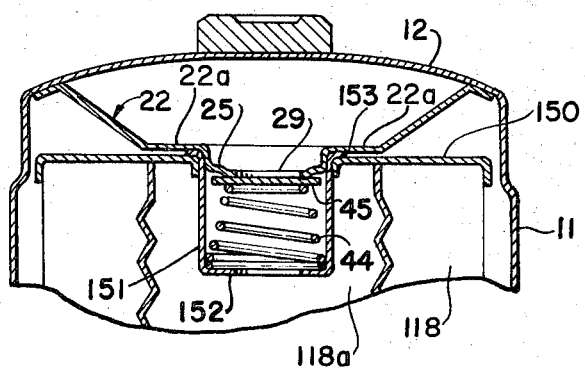
FIG. 12 is a fragmentary sectional view of still another modified embodiment.

As already noted, the end cap 50, the circumferential wall 51 and the shoulder 52 in the embodiment of FIG. 11 are integrally formed. FIG. 12 illustrates a modified arrangement wherein the shoulder 152 is formed integrally with the circumferential wall 151, but the latter is separate from the end cap 150. In this instance the wall 151 is provided at its outer end with an outturned annular flange 153 which is interposed between the end cap 150 and the leaf spring adapter 22, thus holding the parts assembled. Otherwise, the arrangement of the spring 44 and valve element 45 in FIG. 12 is the same as already described in connection with FIG. 11.

As will be apparent the invention is generally applicable to various depth type cartridge constructions as well as to paper cartridge constructions as will be apparent to those skilled in the art, the depth type filter material being well known in the art as is also the paper type cartridge construction.

While in the foregoing there have been described and shown the preferred embodiments of the invention, various modifications may be resorted to within the spirit and scope of the invention as claimed.

What is claimed is:

1. In a fluid filter device, the combination of a housing having a closed end and an open end, a closure plate closing the open end of the housing and provided with a fluid inlet and fluid outlet, a filter cartridge positioned in the housing and including a central tubular discharge member communicating with said fluid outlet, support means on said closure plate for the adjacent end of said cartridge, one-piece leaf spring adapter interposed between the other end of the cartridge and said closed end of the housing for biasing the cartridge against said support means, said adapter having a central opening communicating with said tubular discharge member, a spring-pressed valve element interposed between said other end of the cartridge and said adapter, said valve element normally covering said opening in the adapter but being deflectable from the adapter to uncover the opening as a function of excessive fluid pressure differential at the outside of the cartridge and the inside of said discharge member, and coil-spring means urging said valve element against said adapter to close said opening.

2. The device as defined in claim 1 which is further characterized in that said valve element is imperforate and normally closes said opening in the adapter.

3. The device as defined in claim 1 wherein said valve element is provided with an opening in register with the opening in the adapter, and a screen positioned on the valve element and covering the opening therein, said screen constituting a secondary filtering medium additional to a primary filtering medium afforded by said cartridge.

4. A device as defined in claim 1 wherein the filter cartridge includes a depth type filler.

5. A device as defined in claim 1 wherein the filter cartridge is of the paper type.

6. In a fluid filter device, the combination of a housing having a closed end and an open end, a closure plate closing the open end of the housing and provided with a fluid inlet and a fluid outlet, a filter cartridge positioned in the housing and including an annular filter media having a central discharge opening extending longitudinally through the annular filter media and communicating with said fluid outlet, support means on said closure plate for the adjacent end of said cartridge, a one piece leaf spring adapter interposed between the other end of said cartridge and said closed end of the housing for biasing the cartridge against said support means, said adapter having a center portion closing said central discharge opening at one end and having a bypass opening communicating with said central discharge opening and spaced resilient finger portions extending outwardly from said center portion and bearing against the inner surface of said closed end of said housing, said filter cartridge having an annular shoulder within said central discharge opening which is spaced inwardly from said other end of said cartridge and from said adapter, a valve element interposed between said annular shoulder and said adapter and normally covering said bypass opening, resilient means interposed between said annular shoulder and said valve element for biasing said valve element against said adapter, said resilient means comprising compressible coil spring means deflectable from said adapter to permit said valve element to uncover said central opening in said adapter as a function of excessive fluid pressure differential at the outside of the cartridge and the inside of said central discharge.

7. The device set forth in claim 6 wherein said filter cartridge further includes an annular end cap covering said annular filter media at said other end thereof and a circumferential wall extending inwardly into said central discharge opening from said end cap at one end and terminating in said annular shoulder at its inner end.

8. The device as set forth in claim 7 wherein said circumferential wall is integrally joined to said annular end cap and to said annular shoulder.

9. The device as set forth in claim 7 wherein said end cap, circumferential wall and annular shoulder are of one piece construction.

10. The device as set forth in claim 9 wherein said filter media is a paper filter and said valve element is imperforate and normally closes said opening in said adapter.

11. The device as set forth in claim 7 together with a tubular discharge member joined to the inner circumference of said annular shoulder and extending through said annular filter media to the adjacent end of said cartridge.

12. The device as set forth in claim 11 wherein said filter media is a depth type filter and said valve element is a secondary filter media.

13. The device set forth in claim 6 wherein the center portion of said leaf spring adapter is formed with a cylindrical wall extending axially inwardly into said central discharge opening and a transverse bottom wall at the inner end of said cylindrical wall through which said bypass opening extends.

14. In a fluid filter device, the combination of a housing having a closed end and an open end, a closure plate closing the open end of the housing and provided with a fluid inlet and a fluid outlet, a filter cartridge positioned in the housing and including an annular filter media having a central discharge passage extending longitudinally through the annular filter media and communicating with said fluid outlet, support means on said closure plate for the adjacent end of said cartridge, a one piece leaf spring adapter interposed between the other end of the cartridge and said closed end of the housing for biasing the cartridge against said support means, said adapter having a central opening communicating with said discharge passage in said filter media, said cartridge also including an annular end cap covering said annular filter media and engaged by said leaf spring adapter, an inner circumferential wall extending inwardly from said end cap concentrically with said discharge passage, and an annular shoulder on said circumferential wall in inwardly spaced relation from said end cap, together with a compression spring within said circumferential wall seated on said annular shoulder, and a valve element interposed between said spring and said adapter, said valve element normally covering said opening in the adapter but being deflectable from the adapter against the action of said spring to uncover the opening as a function of excessive fluid pressure differential at the outside of the cartridge and the inside of said discharge passage.

15. The device as set forth in claim 14 which is further characterized in that said valve element is imperforate and normally closes said opening in the adapter.

16. The device as set forth in claim 14 which is further characterized in that said valve element comprises a screen covering said opening in the adapter, said screen constituting a secondary filtering media additional to the annular filter media of said cartridge.

17. The device as set forth in claim 14 wherein said adapter has a substantially circular center portion provided with said opening, said center portion of the adapter being seated within said inner circumferential wall of said cartridge.

18. The device as set forth in claim 14 wherein said inner circumferential wall of said cartridge is longitudinally coextensive with said filter media and defines said discharge passage, said annular shoulder being provided intermediate the ends of said circumferential wall adjacent said end cap.

19. The device set forth in claim 18 wherein said annular shoulder is a flattened annular bead formed integrally with said inner circumferential wall.

20. The device as set forth in claim 14 wherein said end cap and said inner circumferential wall and said annular shoulder are of one-piece construction.

21. The device as set forth in claim 14 wherein said inner circumferential wall and said annular shoulder are of one-piece construction but separate from said end cap, said circumferential wall having an outer end provided with an out-turned flange which is interposed between the end cap and said adapter.

22. The device as set forth in claim 14 wherein a portion at least of the annular end cap is substantially flat and the leaf spring adapter includes end portions engaging the interior of the closed end of the housing and flat intermediate portions engaging the flat annular portion of said end cap over a substantial area.

23. In a fluid filter device, the combination of a housing having a closed end and an open end, a closure plate closing the open end of the housing and provided with a fluid inlet and a fluid outlet, a filter cartridge positioned in the housing and including an annular filter media having a central discharge opening extending longitudinally through the annular filter media and communicating with said fluid outlet, support means on said closure plate for the adjacent end of said cartridge, a spring adapter interposed between the other end of said cartridge and said closed end of the housing for biasing the cartridge against said support means, said adapter having a center portion closing said central discharge opening at one end and having a bypass opening communicating with said central discharge opening and resilient means extending from said center portion and bearing against the inner surface of said closed end of said housing, said filter cartridge having first imperforate tubular portion fitting snugly within said central discharge opening and having an annular shoulder spaced inwardly from said other end of said cartridge and from said adapter, said valve adapter also including a tubular portion fitting snugly within said first imperforate tubular portion and removable therefrom, a valve element comprising a screen interposed between said annular shoulder and said adapter and normally covering said bypass opening, and coil spring means interposed between said annular shoulder and said valve element for biasing said valve element against said adapter, said spring means being deflectable from said adapter to permit said valve element to uncover said central opening in said adapter as a function of excessive fluid pressure differential at the outside of the cartridge and the inside of said central discharge, and said screen serving as a secondary filter.

24. The fluid filter device as set forth in claim 23 wherein a perforated tubular discharge member extends from said annular shoulder through said annular filter media to the end of the cartridge adjacent to the closure plate.

* * * * *